United States Patent [19]

Haas, Sr. et al.

[11] Patent Number: 4,694,741
[45] Date of Patent: Sep. 22, 1987

[54] APPARATUS FOR MAKING ROLLED WAFER CONES

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 904,898

[22] Filed: Sep. 8, 1986

Related U.S. Application Data

[62] Division of Ser. No. 727,006, Apr. 25, 1985, Pat. No. 4,624,885.

[30] Foreign Application Priority Data

May 4, 1984 [AT] Austria ................................. 1491/84

[51] Int. Cl.⁴ ...................... A21C 15/02; A21D 13/00
[52] U.S. Cl. ........................................ 99/354; 99/383; 425/322; 426/501
[58] Field of Search .................. 99/353, 354, 382, 383; 425/319, 322; 426/501, 514, 138

[56] References Cited

U.S. PATENT DOCUMENTS 4,651,634  3/1987  Barton .................................... 99/383

FOREIGN PATENT DOCUMENTS

WO80/01130  6/1980  PCT Int'l Appl. ................... 99/383
1095453  12/1967  United Kingdom ................ 426/501

*Primary Examiner*—Ronald Feldbaum
*Assistant Examiner*—Judith L. Olds
*Attorney, Agent, or Firm*—Kurt Kelman

[57] ABSTRACT

In an apparatus for making a rolled wafer cone from a baked flat wafer blank made from a sugar-containing wafer dough, the baked wafer blank is rolled to form a wafer cone in a winding mold while the wafer blank is still in a soft, deformable state after the baking operation. Thereafter the rolled wafer cone is permitted to harden. In order to ensure the production of wafer cones having consistently exactly the same shape, it is proposed that the wafer cone which is unrestrained at least in part is shortened in the winding mold to a predetermined length while the wafer cone is adapted to be plastically deformed. For this purpose the rolled wafer cone disposed in the winding mold is subjected to a plastic deformation only at one end or only at both ends. The apparatus includes means of winding devices, which are mounted on a rotary frame and each of which comprises a conical winding core, which is secured to a winding shaft that is displaceable relative to the rotary frame to move the conical winding into and out of the winding mold. Each winding device is provided with at least one sizing device, which is associated with the rim of the wafer cone and comprises at least one pressure-applying finger, which is adapted to be introduced between the winding mold and the winding core.

48 Claims, 5 Drawing Figures

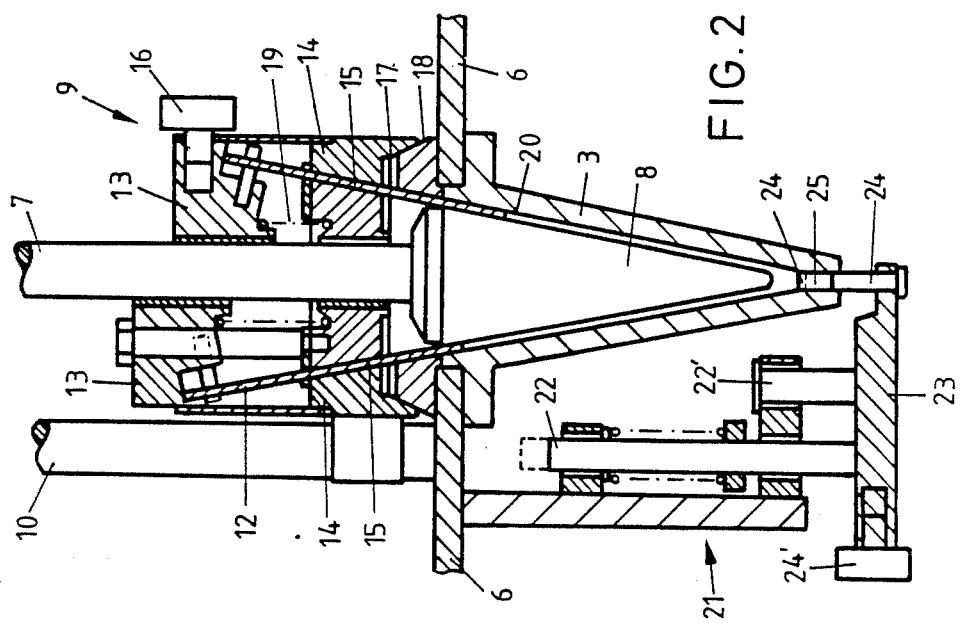
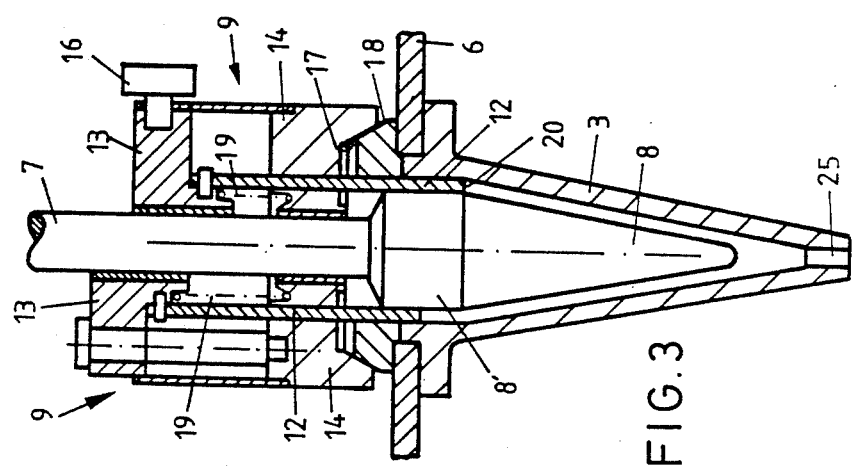

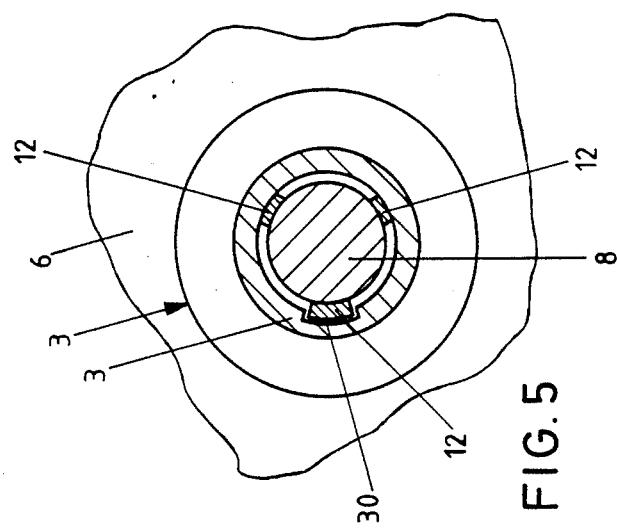
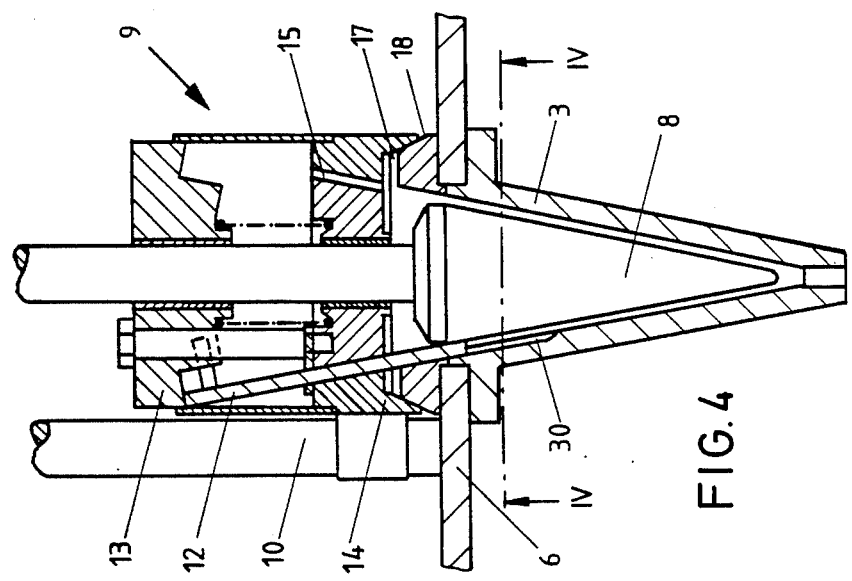

APPARATUS FOR MAKING ROLLED WAFER CONES

CROSS-REFERENCE TO RELATED APPLICATION

This is a division of our copending U.S. patent application Ser. No. 727,006, filed Apr. 25, 1985, now U.S. Pat. No. 4,624,855.

BACKGROUND OF THE INVENTION

1. Field of the Invention

This invention relates to the production of rolled conical hollow wafers from individual baked flat wafer blanks made from sugar-containing dough.

2. Description of the Prior Art

Rolled hollow wafers are known as wafer cones, sweet wafer cones and wafer rolls. Each of these items is formed by rolling a baked wafer sheet or flat wafer blank to a conical or cylindrical shape. Such wafer products belong to the wafer products which are made by machines in the food processing industry and which are offered for sale in a filled or unfilled state and are generally known as luxury foods. In addition to the above-mentioned wafer cones, sugar cones and wafer rolls, these products of the wafer-making industry include other wafer products, such as cast wafer cones, wafer cups, wafer plates, flat wafer discs, low hollow wafers, hollow rods, ice cornets, filled wafers, wafers for ice cream, small filled wafer rods, wafer slices and the like.

Such wafer products are baked products, which are made from wafer dough and have a crisp, brittle, fragile consistency and are baked to be as dry as possible so that they have a very low moisture content. Sweet wafer products may be made from a wafer dough which has a relatively high sugar content. The wafer products made from such wafer doughs can be shaped when they are still warm owing to the baking heat. That property is utilized in the production of hollow rods, sweet cornets, sweet wafer rolls and the like. In that case individual wafer sheets or a continuous wafer web is baked and are or is given the final shape when the sheets are or the web is still soft after the baking operation.

Other wafer products are baked in their final shape. This is the case, e.g., with cast wafer cones, wafer cups, wafer discs, low hollow wafers and the like.

In dependence on the kind of the wafer product, the latter may be provided with any of several coatings made, e.g., of sugar or chocolate, or may contain different filling materials, such as ice cream, various creams, chocolate compositions and the like.

Different from the wafer products are waffles, which are baked in waffle irons, usually by housewives, and which constitute a baked product that is soft and has a consistency like a roll or pancake. Such waffles made by housewives differ greatly in consistency from the wafer products of the wafer industry which have been described hereinbefore.

In the production of rolled hollow wafers it is known that flat wafer blanks which have been baked from a wafer dough having a high sugar content and emerge from an automatic wafer baking machine can be given their final shape in a winding mold in which each wafer blank is rolled around a winding core and that a wafer cone can be formed in this manner, for instance. In that operation each flat wafer blank which emerges from the wafer baking oven and which is produced with a pattern in most cases is either taken directly from the wafer baking plates, introduced into the winding mold and rolled in the latter by a rotation of the winding core, or is taken from the wafer baking plates by a separate taking apparatus and supplied to the winding mold to be rolled therein. After the rolling operation the winding core is preferably arrested or rotated only at a low speed and after a short cooling time, in which the rolled hollow wafer assumes a firmer consistency, that hollow wafer is removed from the winding mold preferably together with the winding core.

The shape of the hollow wafers thus made will depend on the rolling of the flat wafer blank and on the uniformity of the rolling of consecutive wafer blanks. For this reason such hollow wafers vary in shape, particularly in length, diameter and the like. That variation is due to the fact that when the wafer blank is taken from the baking plate and is introduced into the winding mold even slight differences in the shape and size of different wafer blanks will result in a slight twisting of the wafer blank as it is drawn into the wafer mold so that different rolled wafers may differ in height and may have a stepped top edge. Such variations will be inevitable even if the rolling operation is very exactly controlled and in the production of wafer cones, including sweet wafer cones, from suitably shaped wafer blanks these variations have the result that the wafer cones have openings differing in size and have different heights so that their dimensions which are significant for the nesting of the wafer cones and the capacities of the wafer cones for ice cream or the like differ too. These different shapes of the wafer cones give rise to serious problems in the further processing of the wafer cones by machine, e.g., in the finishing or filling of such wafer cones or similar operations.

To permit a further processing of the wafer cones in machines at a high rate, the wafer cones are nested to form long stacks. The nested size of each cone, i.e., the extent to which the wafer cone protrudes from a receiving wafer cone, should be within very close tolerances. But the above-mentioned variations of the shape of the wafer cones involve also large variations of their nested size so that the singling of the wafer cones gives rise to difficulties regarding the pulling and retaining elements and may cause two wafer cones to be pulled off at the same time or a wafer cone to be destroyed as it is pulled off.

In addition to rolled wafer cones, cast wafer cones have been known for a long time. Cast wafer cones are cast in a casting mold which has the dimensions and the surface structure which are desired for the wafer cone. Liquid wafer dough is poured into said casting mold and is baked therein to form the wafer cone, which is then removed. In the production of so-called straw cones the wafer dough used for that operation contains no sugar or has a very low sugar content up to 5% so that damage to the cone as it is removed from the casting mold will be avoided as far as possible. Cast wafer cones containing up to 30% sugar have also been made but special precautions must be taken in their production and include, e.g., the use of certain additives in the dough, a special treatment of the casting molds, etc., in order to ensure that the wafer cones being baked will not firmly stick to the casting molds and the wafer cones will not be damaged as they are removed. So-called sweet wafer cones made from a wafer dough having a high sugar content in excess of 35% are usually made as rolled sugar cones.

It has already been proposed that wafer dough having a high sugar content may be baked in a casting mold which is only roughly similar to the shape of the desired wafer cone and which has smooth inside surfaces so that the baked wafer cone is a blank having only roughly the desired shape. That blank is removed from the casting mold and placed into a reshaping mold, which has exactly the desired dimensions and the desired surface structure (pattern) and in which the blank is compressed to the shape desired for the finished wafer cone. In that operation the wall thickness of the blank is greatly reduced and the blank is given the final shape desired for the wafer cone. That known process of making a cast wafer cone cannot be carried out on an industrial scale in practice because the blank has a very loose structure and owing to the high sugar content of the wafer dough sticks firmly to the casting mold so that the blank cannot be removed from the casting mold without damage and the previously unsolved problems involved in the removal of the blanks from the mold do not permit the wafer cones to be made at a high rate.

SUMMARY OF THE INVENTION

It is an object of the invention to eliminate the disadvantages pointed out in the production of rolled wafer cones and to permit rolled wafer cones to be made with desired dimensions to a high accuracy.

This object is accomplished with an apparatus comprising winding devices, which are mounted on a rotary frame and serve to roll the wafer blanks and each of which comprises a winding mold and a conical winding core, which is fixed to one end of a winding shaft that is axially displaceable relative to the rotary frame to move said winding core into and out of said winding mold, wherein said rotary frame is rotatable to move each winding device from a blank-receiving station, in which the winding mold is adapted to receive a wafer blank to be rolled, through a stripping station, in which the hardened wafer cone sticking to be winding core is removed from the winding mold with the winding core, to a delivery station, in which the finished wafer cone is removed from the winding core. In accordance with the invention that apparatus is characterized in that each winding device comprises sizing device, which is associated with the rim of the wafer cone and comprises at least one pressure-applying finger, which is adapted to be inserted between the winding mold and the winding core.

The pressure-applying finger effects a plastic deformation of the rim of the wafer cone.

Also within the scope of the invention the sizing device is slidably mounted on the winding shaft.

Also within the scope of the invention the sizing device comprises a carrier, which is movably mounted on the winding shaft and carries the pressure-applying finger or fingers, and a backing disc, which is movably mounted on the winding shaft and engageable with the winding mold and provided with slots through which the pressure-applying fingers extend, and a roller is mounted on the carrier and in cooperation with stationary cams displaces the carrier along the winding shaft into and out of engagement with the backing disc. That arrangement permits an exact movement of the pressure-applying finger because the carrier and the backing disc are movably mounted on the winding shaft.

Also within the scope of the invention the backing disc comprises a conical centering surface, which faces the winding mold and is engageable with a conical centering surface of the winding mold. That arrangement ensures that the winding mold, the sizing device and the winding core will be centered and aligned and the sizing device will provide an additional bearing for the winding shaft when the winding core has been introduced into the winding mold.

If the wafer cone is to be shortened while it is at a standstill, the sizing device used within the scope of the invention preferably comprises pressure-applying fingers, which constitute a closed circular structure at least where they engage the rim of the wafer cone.

If the rolled wafer cone is shortened as it is rotated further, it is within the scope of the invention that the pressure-applying finger has an end portion which is adapted to be introduced into the gap between the winding mold and the winding core and said end portion has an end face which is inclined toward the small end of the wafer cone in the direction of rotation of the winding shaft.

Also within the scope of the invention a small-end sizing device associated with the small end of the wafer cone may be secured to the rotary frame and may comprise a pressure-applying finger, which protrudes into the winding mold and is displaceable parallel to the winding shaft and protrudes into a bore that is provided in the small end of the winding mold and coaxial to the winding shaft and in which the pressure-applying finger of the sizing device is displaceable. Such pressure-applying finger may be shaped to act as an ejector for the wafer cones.

Also within the scope of the invention the small-end sizing device may comprise a roller, which is mounted on the carrier for the pressure-applying finger and is adapted to cooperate with stationary cams so as to displace the pressure-applying finger.

The invention provides also a winding device for carrying out the process in accordance with the invention. Such winding device for rolling baked flat wafer blanks comprises a winding mold and a conical winding core, which is secured to one end of a winding shaft, which is axially movable to move said winding core into and out of said winding mold. In accordance with the invention said winding device comprises a sizing device, which is associated with the rim of the wafer cone rolled in the winding mold and comprises at least one pressure-applying finger, which is adapted to be inserted between the winding mold and the winding core.

Such winding device may be used to replace existing winding devices in apparatus for making such rolled wafer cones.

BRIEF DESCRIPTION OF THE DRAWING

FIG. 2 is a longitudinal sectional view showing the lower portion of a conical winding device in an operative position.

FIG. 3 is a longitudinal sectional view showing another embodiment of a conical winding device.

FIG. 4 is a longitudinal sectional view showing a further embodiment of a winding device and FIG. 5 is a transverse sectional view taken on line 4—4 in FIG. 4.

DETAILED DESCRIPTION OF THE PREFERRED EMBODIMENTS

Figure 1:
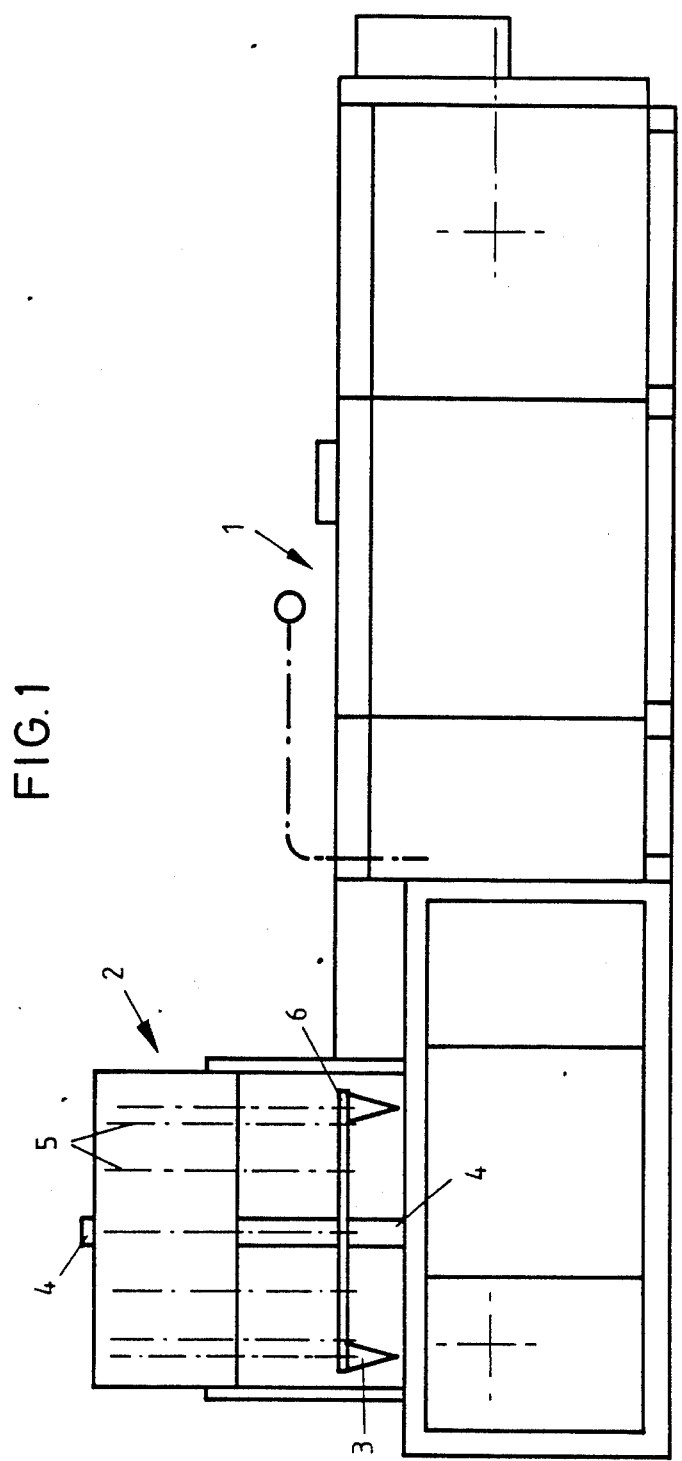
FIG. 1 is a diagrammatic view showing a wafer-baking oven succeeded by a rolling apparatus provided with conical winding devices.

Further advantages and properties of the invention will now be explained more in detail with reference to embodiments of the apparatus in accordance with the invention shown by way of example on the drawing.

Flat wafer blanks are baked from a dough having a high sugar content in a wafer-baking oven 1 comprising revolving baking tongs and at the delivery station of the wafer-baking oven 1 are delivered to a rolling apparatus 2, which comprises winding molds 3, by which individual wafer blanks which are still soft and deformable after the baking operation are successively taken from the opened baking tongs and rolled to form wafer cones which have a predetermined shape and are delivered when they have hardened.

In accordance with the invention each flat wafer blank when it is still soft and deformable after the baking operation is rolled to form a wafer cone, which is unrestrained at least in part. During the rolling operation the edges of the wafer disc move freely without any restraint. When a rolled wafer cone has been formed, that wafer cone is shortened to a predetermined length by subjecting the edge portions of the wafer cone at its large end and, if desired, also at its small end, to a plastic deformation so that any irregularities which have resulted from the rolling operation will be eliminated and the wafer cone will be given an exactly defined length. Thereafter the wafer cone is permitted to harden.

During the shortening of a wafer cone the latter is subjected to such a plastic deformation at its large end that the large end constitutes a circle which is at right angles to the axis of the winding core.

The apparatus shown in the drawing constitutes a rolling apparatus 2, which comprises conical winding molds 3. The rolling apparatus 2 comprises a frame, which is rotatable by a vertical shaft 4 and at its periphery carries the winding devices 5, which are arranged on a circular orbit. During a rotation of the frame each winding device 5 is moved in succession from the blank-receiving station for receiving a flat wafer blank to be rolled, which station faces the delivery station of the wafer-baking oven 1, through a stripping station, in which the hardened wafer cone sticking to the winding core is removed from the winding mold with the winding core, to a delivery station, in which the finished wafer cone is removed from the winding core.

The shaft 4 of the frame carries a lower circular disc 6, and the winding molds 3 of the winding device 5 are secured to the peripheral portion of the disc. Each winding device comprises a winding core 8, which is secured to the lower end of a winding shaft 7 that is axially displaceable relative to the rotary frame to move the winding core 8 into and out of the winding mold 3. A sizing device 9 is slidably mounted on the winding shaft 7.

The sizing device 9 is movably mounted at one end on the winding shaft 7 and is guided at the other end on a column 10, which is parallel to the winding shaft 7. The sizing device 9 comprises a carrier 13, which is movably mounted on the winding shaft 7 and provided with one or more pressure-applying fingers 12 and also comprises a backing disc 14, which is movably mounted on the winding shaft 7 and can be moved into engagement with the winding mold 3. That backing disc 14 is formed with slots 15, through which the pressure-applying fingers 12 extend. A roller 16 is mounted on the carrier 13 and cooperates with stationary cams, not shown, to move the carrier along the winding shaft 7 toward the backing disc 14. The backing disc 14 has a conical centering surface 17, which faces the winding mold 3 and cooperates with a conical centering surface 18 of the winding mold 3. When the winding core 8 has been introduced into the winding mold 3 and the sizing device 9 has been engaged with the winding mold 3, the two centering surfaces 17, 18 cause the sizing device 9 to be centered relative to the winding mold 3 and the sizing device 9 then constitutes an additional bearing for the winding shaft 7 closely above the winding mold 3.

In the embodiment shown in FIG. 2 the pressure-applying fingers 12 secured to the carrier 13 of the sizing device 9 are displaceable along a conical surface, which corresponds to the conical shape of the winding core 8. For a plastic deformation of the rim of the wafer cone, the carrier 13 is displaced on the winding shaft 7 toward the winding mold 3 against the force of the return spring 19 and in the gap defined between the winding mold 3 and winding core 8 to permit the rolling of the wafer blanks the pressure-applying fingers 12 are advanced to an end position, which is defined by the movement of the carrier 13. The pressure-applying fingers 12 have lower end portions 20 formed with end faces which are downwardly inclined in the direction of rotation of the winding shaft 7.

In the embodiment shown in FIG. 3 the conical winding core 8 comprises a cylindrical portion 8', which adjoins the conical winding portion of the core. The associated sizing device 9 differs from that shown in FIG. 2 only in that the pressure-applying fingers 12 are arranged on a cylindrical surface, which is coaxial to the winding shaft 7, and are displaceable along the cylindrical surface as far as the beginning of the conical portion of the winding core 8.

The end portions 20 of the pressure-applying fingers 12 may constitute a closed circular structure if the rim of the wafer cone is to be subjected to plastic deformation while the winding core 8 is at a standstill. If the rim of the wafer cone is subjected to plastic deformation while the winding core is rotated, the pressure-applying fingers need not constitute a closed circular structure.

FIGS. 4 and 5 show a winding device which is similar to that of FIG. 2 and in which the sizing device 9 comprises three pressure-applying fingers 12, which are adapted to be introduced between the winding mold 3 and the winding core 8. One of the pressure-applying fingers 12 is slidable in a groove 30 formed in the inside surface of the winding mold 3. That groove 30 extends in the winding mold 3 as far as to a point disposed below the rim of the wafer cone. The pressure-applying finger 12 extending in the groove 30 has a radial extent in excess of the wall thickness of the cone so that the top face of the rim of the cone is given exactly the desired shape as the rim of the cone is subjected to a plastic deformation by that pressure-applying finger 12.

The embodiments shown in FIGS. 2, 4 and 5 comprise a second sizing device 21, (shown only in FIG. 2) which is associated with the small end of the conical winding mold 3.

The sizing device 21 is secured to the rotary frame and is provided with a carrier 23, which is slidably mounted on guide columns 22, 22' and carries a pressure-applying finger 24 at one end and a roller 24' at the other end. The winding mold 3 is provided at its small end with a bore 25, which is coaxial to the winding shaft 7 and in which the pressure-applying finger 24 is slidably mounted.

For effecting a displacement of the pressure-applying finger 24, the roller 24' mounted on the carrier 23 cooperates with stationary cams, not shown.

What is claimed is:

1. Apparatus for making a rolled wafer cone having an annular cone rim and a closed cone tip, which comprises
   (a) wafer-baking oven for baking a plastically deformable, flat wafer blank of a sugar-containing dough, the blank having a circumferentially extending rim and the oven having a delivery station for the baked flat wafer blank, and
   (b) a rolling apparatus having a blank-receiving station facing the oven delivery station for receiving the baked flat wafer blank to be rolled into the wafer cone and a rolling apparatus delivery station for delivering the rolled wafer cone, the rolling apparatus comprising:
      (1) a rotary frame rotatable about an axis and having a circumference surrounding the axis, and
      (2) a plurality of winding devices spaced from each other along the circumference of the frame and mounted thereon for rotation therewith between the blank-receiving and delivery stations of the rolling apparatus, each winding device comprising:
         (i) a winding mold having a conical inside surface defining a conical cavity having a longitudinal axis, a wide open end and a narrow end opposite thereto, the winding mold having a slot for introducing the baked flat wafer blank into the conical cavity,
         (ii) a rotatable winding shaft extending coaxially with the longitudinal winding mold cavity axis and parallel to the rotary frame axis, the winding shaft being axially displaceable and having an end facing the winding mold,
         (iii) a conical winding core secured to the winding shaft end for rotation therwith and movable into the conical winding mold cavity upon axial displacement of the winding shaft whereby the conical inside surfaces of the winding mold and the conical winding core define a gap receiving the plastically deformable, flat baked wafer blank through the slot in the winding mold for rolling the wafer blank into the wafer cone upon rotation of the winding shaft and winding core secured thereto while the rim of the blank remains unrestrained and a portion of the unrestrained blank rim forms the cone rim, and
         (iv) a sizing device for plastically deforming the cone rim of the rolled wafer cone until it has an accurately defined annular rim and an accurately defined length extending between the cone rim and cone tip.

2. The apparatus of claim 1, wherein the sizing device comprises a pressure-applying finger movable into the gap between the conical inside surfaces of the winding mold and the conical winding core, the pressure-applying finger having an end engageable with the rolled wafer blank in the range of the cone rim for plastically deforming the same.

3. The apparatus of claim 2, wherein the sizing device comprises a plurality of said pressure-applying fingers the ends of which define a closed circle upon engagement with the cone rim.

4. The apparatus of claim 2, wherein the end of the pressure-applying finger has an obliquely extending face for engagement with the cone rim.

5. The apparatus of claim 2, wherein the winding mold has an axially extending groove in the range of the wide open end of the conical cavity, the groove being open towards the conical cavity and slidably receiving the pressure-applying finger, the end of the finger having a radially extending thickness exceeding that of the gap.

6. The apparatus of claim 1, wherein the sizing device is axially slidably mounted on the winding shaft and comprises at least one pressure-applying finger movable into the gap between the conical inside surface of the winding mold and the conical winding core, the pressure-applying finger having an end engageable with the rolled wafer blank in the range of the cone rim for plastically deforming the same.

7. The apparatus of claim 6, wherein the pressure-applying finger is axially slidable along a conical surface extending coaxially with the winding mold.

8. The apparatus of claim 6, wherein the pressure-applying finger is axially slidable along a cylindrical surface extending coaxially with the winding mold.

9. The apparatus of claim 1, wherein the sizing device is axially slidably mounted on the winding shaft and comprises
   (a) a backing disc mounted on the winding shaft and movable into engagement with the winding mold upon axial sliding of the sizing device and
   (b) a carrier movably mounted on the winding shaft for movement therealong towards and away from the backing disc,
      (1) at least one pressure-applying finger being mounted on the carrier for slidable movement into the gap between the inside surface of the winding mold and the winding core, the pressure-applying finger having an end engageable with the rolled wafer blank in the range of the cone rim for plastically deforming the same, and
      (2) the backing disc defining a slot arranged to receive the pressure-applying finger during the slidable movement thereof.

10. The apparatus of claim 9, wherein the pressure-applying finger is axially slidable along a conical surface extending coaxially with the winding mold.

11. The apparatus of claim 9, wherein the pressure-applying finger is axially slidable along a cylindrical surface extending coaxially with the winding mold.

12. The apparatus of claim 9, further comprising a roller mounted on the carrier and cooperating with stationary camming means for controlling the movement of the carrier along the winding shaft in dependence on the rotation of the rotary frame.

13. The apparatus of claim 9, wherein the backing disc has a first conical centering surface facing the winding mold and the winding mold has a second conical centering surface facing the first conical centering surface and engageable therewith for centering the sizing device with respect to the winding mold.

14. The apparatus of claim 1, comprising a further sizing device arranged to deform the cone tip of the rolled wafer blank until the wafer cone has an accurately defined length extending between the cone rim and cone tip.

15. The apparatus of claim 14, the narrow end of the winding mold has a coaxially extending bore and the further sizing device has a pressure-applying finger slidably mounted in the bore for projecting into the conical cavity and displaceable into engagement with the cone tip for deforming the same.

16. The apparatus of claim 15, wherein the further sizing device comprises a carrier for the pressure-applying finger, the carrier being slidably mounted on the winding device for displacement parallel to the winding shaft, and a roller mounted on the carrier and cooperating with stationary camming means for controlling the movement of the carrier along the winding device in dependence on the rotation of the rotary frame for displacement of the pressure-applying finger.

17. Apparatus for making a rolled wafer cone having an annular cone rim and a closed cone tip from a baked, plastically deformable, flat wafer blank of a sugar-containing dough, the blank having a circumferentially extending rim, which comprises
(a) a rotary frame rotatable about an axis and having a circumference surrounding the axis, and
(b) a plurality of winding devices spaced from each other along the circumference of the frame and mounted thereon for rotation therewith between a blank-receiving station and a delivery station for the rolled wafer cone, each winding device comprising
(1) a winding mold having a conical inside surface defining a conical cavity having a longitudinal axis, a wide open end and a narrow end opposite thereto, the winding mold having a slot for introducing the baked flat wafer blank into the conical cavity,
(2) a rotatable winding shaft extending coaxially with the longitudinal winding mold cavity axis and parallel to the rotary frame axis, the winding shaft being axially displaceable and having an end facing the winding mold,
(3) a conical winding core secured to the winding shaft end for rotation therewith and movable into the conical winding mold cavity upon axial displacement of the winding shaft whereby the conical inside surface of the winding mold and the conical winding core define a gap receiving the plastically deformable, flat baked wafer blank through the slot in the winding mold for rolling the wafer blank into the wafer cone upon rotation of the winding shaft and winding core secured thereto while the rim of the blank remains unrestrained and a portion of the unrestrained blank rim forms the cone rim, and
(4) a sizing device for plastically deforming the cone rim of the rolled wafer cone until it has an accurately defined annular rim and an accurately defined length extending between the cone rim and cone tip.

18. The apparatus of claim 17, wherein the sizing device comprises a pressure-applying finger movable into the gap between the conical inside surface of the winding mold and the conical winding core, the pressure-applying finger having an end engageable with the rolled wafer blank in the range of the cone rim for plastically deforming the same.

19. The apparatus of claim 18, wherein the sizing device comprises a plurality of said pressure-applying fingers the ends of which define a closed circle upon engagement with the cone rim.

20. The apparatus of claim 18, wherein the end of the pressure-applying finger has an obliquely extending face for engagement with the cone rim.

21. The apparatus of claim 18, wherein the winding mold has an axially extending groove in the range of the wide open end of the conical cavity, the groove being open towards the conical cavity and slidably receiving the pressure-applying finger, the end of the finger having a radially extending thickness exceeding that of the gap.

22. The apparatus of claim 17, wherein the sizing device is axially slidably mounted on the winding shaft and comprises at least one pressure-applying finger movable into the gap between the conical inside surface of the winding mold and the conical winding core, the pressure-applying finger having an end engageable with the rolled wafer blank in the range of the cone rim for plastically deforming the same.

23. The apparatus of claim 22, wherein the pressure-applying finger is axially slidable along a conical surface extending coaxially with the winding mold.

24. The apparatus of claim 22, wherein the pressure-applying finger is axially slidable along a cylindrical surface extending coaxially with the winding mold.

25. The apparatus of claim 17, wherein the sizing device is axially slidably mounted on the winding shaft and comprises:
(a) a backing disc mounted on the winding shaft and movable into engagement with the winding mold upon axial sliding of the sizing device and
(b) a carrier movably mounted on the winding shaft for movement therealong towards and away from the backing disc,
(1) at least one pressure-applying finger being mounted on the carrier for slidable movement into the gap between the inside surface of the winding mold and the winding core, the pressure-applying finger having an end engageable with the rolled wafer blank in the range of the cone rim for plastically deforming the same, and
(2) the backing disc defining a slot arranged to receive the pressure-applying finger during the slidable movement thereof.

26. The apparatus of claim 25, wherein the pressure-applying finger is axially slidable along a conical surface extending coaxially with the winding mold.

27. The apparatus of claim 25, wherein the pressure-applying finger is axially slidable along a cylindrical surface extending coaxially with the winding mold.

28. The apparatus of claim 25, further comprising a roller mounted on the carrier and cooperating with stationary camming means for controlling the movement of the carrier along the winding shaft in dependence on the rotation of the rotary frame.

29. The apparatus of claim 25, wherein the backing disc has a first conical centering surface facing the winding mold and the winding mold has a second conical centering surface facing the first conical centering surface and engageable therewith for centering the sizing device with respect to the winding mold.

30. The apparatus of claim 17, comprising a further sizing device arranged to deform the cone tip of the rolled wafer blank until the wafer cone has an accurately defined length extending between the cone rim and cone tip.

31. The apparatus of claim 30, the narrow end of the winding mold has a coaxially extending bore and the further sizing device has a pressure-applying finger slidably mounted in the bore for projecting into the conical cavity and displaceable into engagement with the cone tip for deforming the same.

32. The apparatus of claim 31, wherein the further sizing device comprises a carrier for the pressure-applying finger, the carrier being slidably mounted on the winding device for displacement parallel to the winding shaft, and a roller mounted on the carrier and cooperating with stationary camming means for controlling the movement of the carrier along the winding device in dependence on the rotation of the rotary frame for displacement of the pressure-applying finger.

33. A winding device for making a rolled wafer cone having an annular cone rim and a closed cone tip from a baked, plastically deformable, flat wafer blank of a sugar-containing dough, which comprises:
 (a) a winding mold having a conical inside surface defining a conical cavity having a longitudinal axis, a wide open end and a narrow end opposite thereto, the winding mold having a slot for introducing the baked flat wafer blank into the conical cavity,
 (b) a rotatable winding shaft extending coaxially with the longitudinal winding mold cavity axis and parallel to the rotary frame axis, the winding shaft being axially displaceable and having an end facing the winding mold,
 (c) a conical winding core secured to the winding shaft end for rotation therewith and movable into the conical winding mold cavity upon axial displacement of the winding shaft whereby the conical inside surface of the winding mold and the conical winding core define a gap receiving the plastically deformable, flat baked wafer blank through the slot in the winding mold for rolling the wafer blank into the wafer cone upon rotation of the winding shaft and winding core secured thereto while the rim of the blank remains unrestrained and a portion of the unrestrained blank rim forms the cone rim, and
 (d) a sizing device for plastically deforming the cone rim of the rolled wafer cone until it has an accurately defined annular rim and an accurately defined length extending between the cone rim and cone tip.

34. The apparatus of claim 33, wherein the sizing device comprises a pressure-applying finger movable into the gap between the conical inside surface of the winding mold and the conical winding core, the pressure-applying finger having an end engageable with the rolled wafer blank in the range of the cone rim for plastically deforming the same.

35. The apparatus of claim 34, wherein the sizing device comprises a plurality of said pressure-applying fingers the ends of which define a closed circle upon engagement with the cone rim.

36. The apparatus of claim 34, wherein the end of the pressure-applying finger has an obliquely extending face for engagement with the cone rim.

37. The apparatus of claim 34, wherein the winding mold has an axially extending groove in the range of the wide open end of the conical cavity, the groove being open towards the conical cavity and slidably receiving the pressure-applying finger, the end of the finger having a radially extending thickness exceeding that of the gap.

38. The apparatus of claim 33, wherein the sizing device is axially slidably mounted on the winding shaft and comprises at least one pressure-applying finger movable into the gap between the conical inside surface of the winding mold and the conical winding core, the pressure-applying finger having an end engageable with the rolled wafer blank in the range of the cone rim for plastically deforming the same.

39. The apparatus of claim 38, wherein the pressure-applying finger is axially slidable along a conical surface extending coaxially with the winding mold.

40. The apparatus of claim 38, wherein the pressure-applying finger is axially slidable along a cylindrical surface extending coaxially with the winding mold.

41. The apparatus of claim 33, wherein the sizing device is axially slidably mounted on the winding shaft and comprises:
 (a) a backing disc mounted on the winding shaft and movable into engagement with the winding mold upon axial sliding of the sizing device and
 (b) a carrier movably mounted on the winding shaft for movement therealong towards and away from the backing disc,
  (1) at least one pressure-applying finger being mounted on the carrier for slidable movement into the gap between the inside surface of the winding mold and the winding core, the pressure-applying finger having an end engageable with the rolled wafer blank in the range of the cone rim for plastically deforming the same, and
  (2) the backing disc defining a slot arranged to receive the pressure-applying finger during the slidable movement thereof.

42. The apparatus of claim 41, wherein the pressure-applying finger is axially slidable along a conical surface extending coaxially with the winding mold.

43. The apparatus of claim 41, wherein the pressure-applying finger is axially slidable along the cylindrical surface extending coaxially with the winding mold.

44. The apparatus of claim 41, further comprising a roller mounted on the carrier and cooperating with stationary camming means for controlling the movement of the carrier along the winding shaft in dependence on the rotation of the rotary frame.

45. The apparatus of claim 41, wherein the backing disc has a first conical centering surface facing the winding mold and the winding mold has a second conical centering surface facing the first conical centering surface and engageable therewith for centering the sizing device with respect to the winding mold.

46. The apparatus of claim 33, comprising a further sizing device arranged to deform the cone tip of the rolled wafer blank until the wafer cone has an accurately defined length extending between the cone rim and cone tip.

47. The apparatus of claim 46, the narrow end of the winding mold has a coaxially extending bore and the further sizing device has a pressure-applying finger slidably mounted in the bore for projecting into the conical cavity and displaceable into engagement with the cone tip for deforming the same.

48. The apparatus of claim 47, wherein the further sizing device comprises a carrier for the pressure-applying finger, the carrier being slidably mounted on the winding device for displacement parallel to the winding shaft, and a roller mounted on the carrier and cooperating with stationary camming means for controlling the movement of the carrier along the winding device in dependence on the rotation of the rotary frame for displacement of the pressure-applying finger.

* * * * *